Nov. 18, 1958   N. SCHEFFER ET AL   2,861,148
MOVABLE SELECTOR MECHANISM WITH FIXED CONTACTS
Filed Nov. 7, 1955   2 Sheets-Sheet 1

INVENTORS
N. SCHEFFER
F.C.W. SLOOFF

AGENT

Nov. 18, 1958  N. SCHEFFER ET AL  2,861,148
MOVABLE SELECTOR MECHANISM WITH FIXED CONTACTS
Filed Nov. 7, 1955  2 Sheets-Sheet 2

INVENTORS
NICOLAAS SCHEFFER
FLORUS CORNELIS WILLEM SLOOFF

United States Patent Office 2,861,148
Patented Nov. 18, 1958

2,861,148

MOVABLE SELECTOR MECHANISM WITH FIXED CONTACTS

Nicolaas Scheffer and Florus Cornelis Willem Slooff, Hilversum, Netherlands, assignors, by mesne assignments, to North American Philips Company, Inc., New York, N. Y., a corporation of Delaware Application November 7, 1955, Serial No. 545,450

Claims priority, application Netherlands November 6, 1954

2 Claims. (Cl. 200—105)

The invention relates to a selector comprising a movable wiper carriage adapted to be stopped in a number of contact positions, which carriage is connected to a driving shaft by means of a coupling adapted to be disengaged and has movable wipers which only engage fixed contacts of a bank of contacts when the wiper carriage is stationary.

It is well known to produce the movement of said wipers to the fixed contacts by means of a magnet which may be the stop magnet. It is also known to derive the wiper motion from a part of the coupling between the wiper carriage and the driving mechanism which moves against spring action after the carriage has been stopped. It is an object of the invention to provide a construction of such a selector which can be readily manufactured and in which the means controlling the movable wipers are independent of the design of the stop magnet and the coupling between the driving shaft and the wiper carriage.

According to the invention a movable wiper is associated with a spring which urges the wiper to the fixed contacts and a member which is adapted to be moved relatively to the wiper carriage and, due to inertia forces produced by change in the motion of the wiper carriage, is subjected to a displacement against a spring force, which displacement controls the wiper.

If the selector is of the rotating type, a radial deflection of the member can be used to keep the wipers connected thereto disengaged from the fixed contacts during the rotation of the wiper carriage.

Instead of using a centrifugal displacement of the member for controlling a wiper, the member may be adapted to be moved in the direction of movement of the wiper carriage. In this event the member is moved by the action of the inertia forces which are produced when the wiper carriage is started or stopped. Thus, the carriage need not rotate but the selector may comprise a wiper carriage which moves in a straight line. Since, in contradistinction the above-mentioned embodiment comprising a member which is adapted to be moved outward, the movement of the member is not maintained for the entire period of movement of the wiper carriage. According to the invention, a movable wiper is held in its disengaged position by means of a pawl which is lifted by means of the member on the carriage being stopped and consequently permits the wiper to come into contact with a fixed bank contact under the action of the spring force acting upon it.

The return of the wiper to the disengaged position when the wiper carriage is again started can be effected in various ways. According to the invention, this return can be obtained by means of a second member adapted to be moved by inertia forces, which second member lags behind the wiper carriage during starting and thus disengages the wiper from the fixed contacts and brings it within range of the pawl.

In an alternative embodiment in accordance with the invention the movable wiper or its holder is connected to an arm one end of which in that position of the wiper in which the latter engages with a fixed bank contact is disposed between two of a row of fixed teeth, which end is pressed back by a tooth when the wiper carriage is started, so that the arm brings the wiper within range of the pawl.

The invention will now be described in light of the diagrammatic drawings, in which:

Fig. 4 is part of a vertical sectional view taken along the line IV—IV of Fig. 3, while

Figure 1:
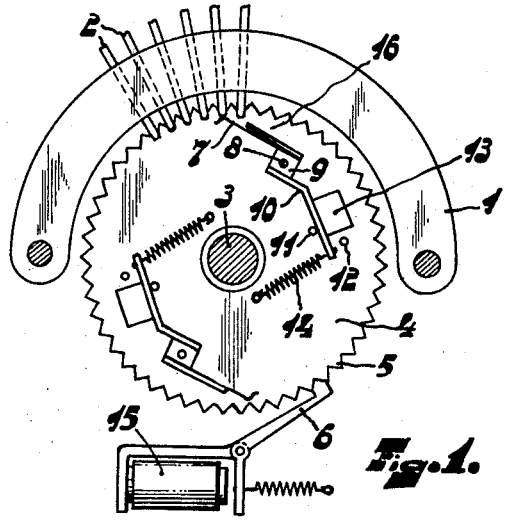
Fig. 1 shows a first embodiment of a selector including a movable wiper carriage in accordance with the present invention and Fig. 2 illustrates a second embodiment thereof

Referring now more particularly to the drawings, the selector shown in Fig. 1 has a semicircular contact bank 1 which contains a number of rows of fixed bank-contacts. A number of contacts 2 from one of these rows are shown in the drawing, which contacts comprise lengths of wire of which the ends directed toward the center of the contact bank are rounded. A shaft 3 about which a wiper carriage 4 is rotatable is arranged coaxially with the bank 1. The carriage is provided with a toothed rim 5 as a drive with which a pivoted stop-pawl 6 can co-operate in order to stop the wiper carriage. In addition to wipers of conventional form (not shown) sliding over fixed contacts the wiper carriage carries two diametrically opposed sets of movable wipers 7 which only engage fixed contacts when the carriage is stationary. These wipers 7 are each secured to a vertical supporting column 9 which is rotatable about a spindle 8 supported by the carriage. This supporting column is provided with an arm 10 which is adapted to be moved between two fixed stops 11 and 12 provided on the wiper carriage. The arm 10 carries a mass 13 and is acted upon by a draw spring 14, the other end of which is secured to the wiper carriage, and which urges the arm against the stop 11 in the manner shown when the wiper carriage is stationary. In this position the ends of the wipers 7 engage the fixed contacts.

When due to energization of a magnet 15 the stop pawl 6 is raised and the wiper carriage is coupled to a continuously rotating driving-shaft in a known manner (not shown), the mass 13 will move outward against the force of the spring 14 due to the rotation of the wiper carriage. The supporting column 9 is rotated about the spindle 8 so that the wipers 7 are disengaged from the fixed contacts by a longitudinal support 16 which is arranged parallel to them and is connected to the column 9, and will be maintained disengaged during the rotation of the wiper carriage.

When due to the interruption of the energization of the magnet 15 the wiper carriage is again stopped by the pawl 6, the mass 13 will be pulled inward by the spring 14 so that the wipers 7 again engage with the fixed contacts.

Figure 2:
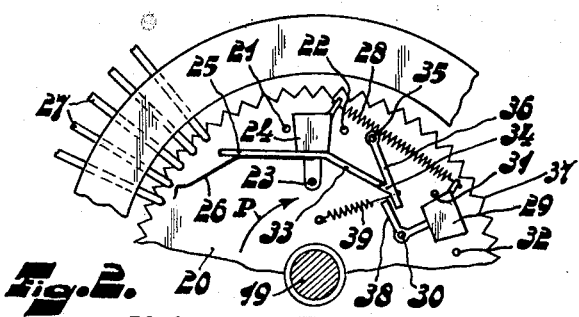

In the selector shown in Fig. 2 the wipers are controlled by means of the displacement of a member in the direction of movement of the wiper carriage. More particularly, the wiper carriage 20 which is adapted to rotate about the shaft 19 carries a mass 24 the movement of which is restricted by stops 21 and 22 and which is rotatable about a spindle 23. This mass has movable wipers 26 connected to it which extend along and are secured to a supporting strip 25 and which in a stationary position of the selector cooperate with fixed contacts 27. The mass 24 is connected by means of a spring 28 to a second mass 29 which is adapted to pivot about a spindle 30 and can move between stops 31 and 32.

When the wiper carriage is rotated in the direction P, its parts occupy the relative positions which are shown in the figure. The mass 29 is held to the stop 31 by the spring 28. An extension of the supporting strip 25 secured to the mass 24 in the form of an arm 33 is held by a stud 34 of a pawl 36 which is adapted to pivot about a point 35 and is subjected to the action of a spring 39. In this position of the mass 24 the movable wipers 26 are disengaged from the fixed contacts. When the rotation of the wiper carriage 20 is stopped by means of a stop pawl (not shown) which co-operates with the toothed rim 37 provided along the circumference of the wiper carriage, the mass 29 due to its inertia will move in the initial direction of movement P against the force of the spring 28. During this movement an arm 38 secured to the mass 29 compels the end of the pawl 36 to follow its movement, so that the arm 33 is released and the mass 24 engages the stop 22 under the action of the spring 28. This movement of the mass 24 also causes the ends of the wipers 26 to engage fixed contacts 27. Thereupon the mass 29 returns to the stop 31 under the action of the spring 28.

When the wiper carriage is again released and consequently driven, the mass 24 will lag behind the wiper carriage due to inertia and will be moved towards the stop 21. Thus, the wipers 26 are disengaged from the fixed contacts while, in addition, the arm 33 again comes to rest behind the stud 34 of the pawl 36, so that the wiper returns to the position shown in Fig. 2.

Figure 3:
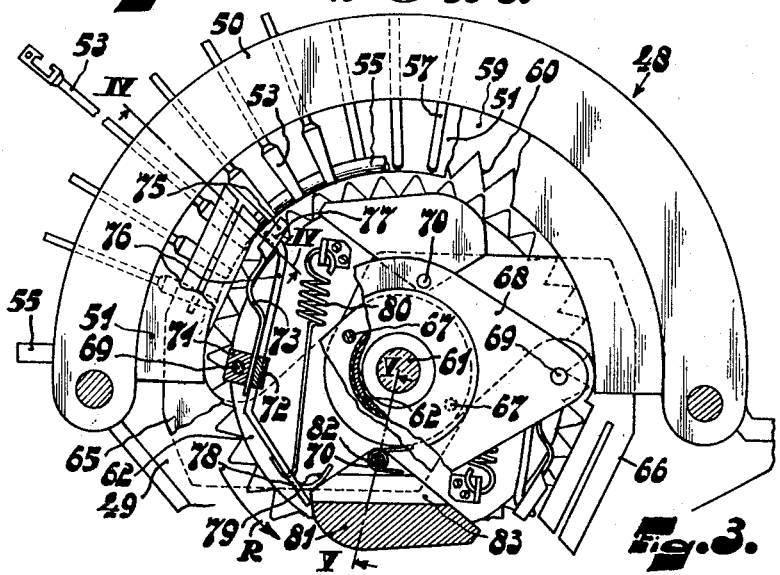
Fig. 3 is a plan view of a third embodiment which is partially broken away.
Figure 4:
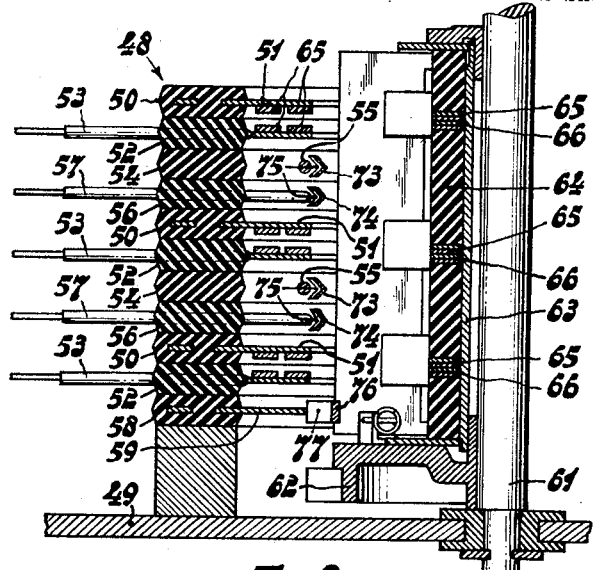
Figure 5:
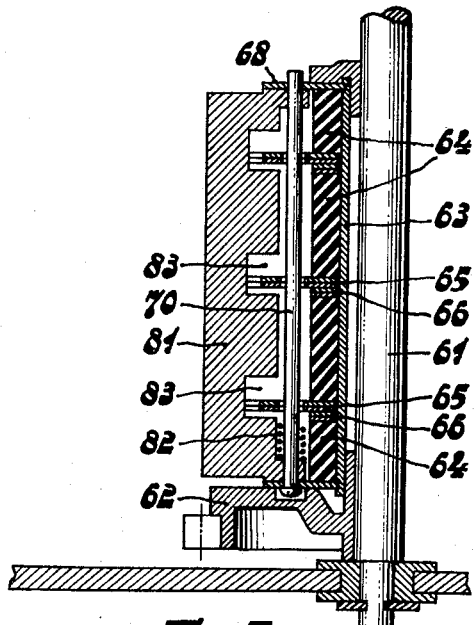
Fig. 5 is a vertical sectional view taken along the line V—V of Fig. 3.

The selector shown in Figs. 3, 4, and 5 is provided with a semicircular contact bank 48 which is secured to a base plate 49 (Fig. 4). The contact bank comprises a number of semicircular strips of insulating material which are connected to one another by means of a hardened ethoxylin resin and which contain metal contact members of various shapes. These strips are made in a known manner by pressing a powdered mixture of an ethoxylin resin and a filler in a mould so as to surround the contact members, and hardening the obtained product in a furnace. Strips 50 contain a contact member in the form of a semicircular metal strip 51 which projects inwardly, strips 52 each containing a row of radial wire segments 53, the ends of which are flattened. Strips 54 provided with a curved length of wire 55 which extend along the inner circumference of the strip and the radial ends of which are held in the insulating material, while strips 56 each contain a row of radial wire segments 57 the inner ends of which are rounded. The lower insulation strip 58 of the contact bank supports a semicircular plate 59, the inner edge of which is provided with teeth 60.

A shaft 61 about which a wiper carriage is adapted to rotate is arranged in the base-plate 49 so as to be co-axial with the contact bank 48. This wiper carriage which exhibits radial symmetry comprises a base 62 in the form of a toothed wheel and a cylindrical part 63 secured thereto. Over this part 63 insulating annular spacers 64 are moved between each pair of which two pairs of sliding wipers 65 and 66 are arranged at the level of two successive insulation strips 50 and 52. The two pairs are arranged in radial symmetry, while the two electrically interconnected wipers of each pair only differ in that their ends which are forked in the usual manner are bent vertically in a different direction so that one wiper can engage a contact strip 51 and the other a row of contact wires 53 and thus establish a direct connection between these contact members. The wipers and the annular spacer are locked against rotation relative to the wiper carriage by insulating pins 67 passing through them.

At its upper end the wiper carriage is provided with a substantially diamond-shaped supporting plate 68 in which two pairs of vertical spindles 69 and 70 are journalled, which spindles have their other ends supported from parts of the base 62 of the wiper carriage.

The spindles 69 are surrounded by vertical insulating supporting columns 71 to which by means of blocks 72 two pairs of wipers 73 and 74 are secured opposite the contact members 53 and 55. The two wipers of each pair are electrically connected together in the proximity of their attachment to the column 71. One end of said wipers comprises a part 75 which is bent so as to be V-shaped and which can be moved toward or away from one of the semi-circular curved wires 55 respectively and the rounded end of one of the radial wire segments 53 by rotation of the column 71.

In the operation of the selector the wiper carriage is rotated in the direction R and the wipers 73 and 74 are disengaged from the said contact members in the contact bank 48, as is shown in the figures. At the lower end of each column 71 provision is made, in the plane of the metal plate 59 having teeth 60, of an arm 76 comprising a pointed end 77 adapted to engage with said teeth when the wipers 73 and 74 engage the fixed contacts, but which is free from said teeth during the movement of the wiper carriage. The other end of the arm 76 is divided by means of a horizontal cut into two parts 78 and 79 between which the end of a spring 80 secured to the base of the wiper carriage engages. This spring tends to move the wipers 73 and 74 and the end 77 of the arm 76 towards the contact bank. This movement is prevented in the position shown by the co-operation of the part 78 with a mass 81 which is adapted to pivot about the spindle 70. This mass is subjected to the force of a spring 82 which loosely surrounds the spindle 70 and one end of which engages one of the spacers 64 while the other end engages the inner side of the mass 81 which is internally provided with recesses 83. The spring 82 tends to rotate the mass 81 in a clockwise direction, as seen from above in Figure 3, which rotation is prevented by the bent end 79 of the arm 76. The sliding wipers 65 and 66 pass unimpeded through the recesses 83 and are provided with apertures for the spindle 70.

When the rotation of the wiper carriage in the direction R is stopped by means of a stop pawl (not shown), the mass 81 will rotate about the spindle 70 against the action of the spring 82 due to inertia forces, with the result that the end 78 of the arm 76 is released. Thereupon the column 71 is rotated by the spring 80 so that the wipers 73 and 74 engage the fixed contacts 55 and 53 respectively associated with them. Each pair of such wipers thus establishes an electrical connection between the semicircular bent length of wire 55 and one of the contacts in a row of lengths of wire 53 having rounded front ends. The end 77 also arrives in the space between two teeth 60 of the plate 59. During this rotation of the column 71 the end 78 of the arm 76 snaps behind the mass 81 so that the mass is prevented from rotating back.

When the wiper carriage is again actuated due to the engagement of the end 77 of the arm 75 with a tooth 60, the column 71 will be restored to its initial position, the mass 81 again arriving behind the end 78 and engaging the end 79, so that the supporting column 71 is again locked in the position in which the wipers 73 and 74 are disengaged from the associated fixed contact members and, in addition, the end 77 is disengaged from the toothed rim 60. Consequently, during the movement of the wiper carriage there is no wear between the wipers 74 and 73 and the fixed contacts in the contact bank.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A selector mechanism co-acting with a plurality of fixed contacts on a contact bank comprising a wiper carriage adapted to be stopped in a plurality of contact positions, a driving shaft, a disengageable coupling linking said driving shaft with said carriage, a plurality of movable wipers mounted on said carriage, said wipers engaging selected fixed contacts when said carriage is stationary, a spring urging each of said wipers into an operative position in engagement with a selected fixed contact, a pawl device for locking each of said wipers in an inoperative position, a movable inertia member mounted on each carriage, and yieldable means biasing said inertia member in a clockwise direction, said inertia member being displaced by inertia against said yieldable means relative to the wiper carriage upon stoppage of the latter, said inertia member being operatively coupled to said pawl device whereby said pawl device unlocks said wipers upon the arresting of said wiper carriage.

2. A selector mechanism as claimed in claim 1 further comprising a toothed element secured to said contact bank, an arm associated with each of said movable wipers and in the stopped position of said carriage said arm being held between two successive teeth of said toothed element whereby upon commencement of rotation of said carriage the arm is disengaged from said toothed element.

References Cited in the file of this patent

UNITED STATES PATENTS

| | | |
|---|---|---|
| 1,037,344 | Sinclair | Sept. 3, 1912 |
| 1,558,822 | Baker | Oct. 27, 1925 |
| 1,652,449 | Miller | Dec. 13, 1927 |
| 2,626,998 | Coombes | Jan. 27, 1953 |
| 2,699,468 | Unk | Jan. 11, 1955 |

FOREIGN PATENTS

| | | |
|---|---|---|
| 652,722 | Germany | Oct. 21, 1937 |